U nited States Patent [19]

Beasley et al.

[11] 4,374,224

[45] Feb. 15, 1983

[54] TREE-RESISTANT ETHYLENE POLYMER COMPOSITIONS CONTAINING AROMATIC POLYCARBOXYLIC ACID

[75] Inventors: John K. Beasley, Wilmington, Del.; Edward J. Urban, Kennett Square, Pa.

[73] Assignee: E. I. Du Pont de Nemours and Company, Wilmington, Del.

[21] Appl. No.: 301,513

[22] Filed: Sep. 14, 1981

[51] Int. Cl.³ ............................................. C08K 5/12
[52] U.S. Cl. .................................... 524/298; 524/285;
524/286; 524/287; 524/293; 524/294; 524/295;
524/299; 524/585
[58] Field of Search ............... 524/294, 295, 298, 585,
524/285-287; 525/172, 177

[56] References Cited

U.S. PATENT DOCUMENTS

| Re. 29,099 | 1/1977 | Kietzman et al. | 525/172 |
|---|---|---|---|
| 2,964,497 | 12/1960 | Kibler et al. | 524/295 |
| 3,223,752 | 12/1965 | Tate et al. | 525/172 |
| 3,639,376 | 2/1972 | DePierri et al. | 524/298 |
| 4,282,333 | 8/1981 | Irie et al. | 524/585 |

FOREIGN PATENT DOCUMENTS 927489  7/1959  United Kingdom .

OTHER PUBLICATIONS

J. Nanu, M. Tolan, C. Cojemu (Rumanian Title and Text English Abstract), Materiale Plastice 12, No. 3, 1975, pp. 138-149.

*Primary Examiner*—Carman J. Seccuro

[57] ABSTRACT

Propagation of electrical trees and water trees in electrical insulation made of ethylene homopolymers or copolymers with an unsaturated monomer is inhibited by the addition to the insulating composition of an organic carboxylic ester having at least one aromatic ring and at least three carboxylic ester groups, the ester being liquid at the operating temperature of the electrical equipment in which the insulation is used. The main utility of the inhibitors of this invention is in the primary insulation for power transmission cables, especially those used in high voltage applications.

11 Claims, 1 Drawing Figure

CONTROL
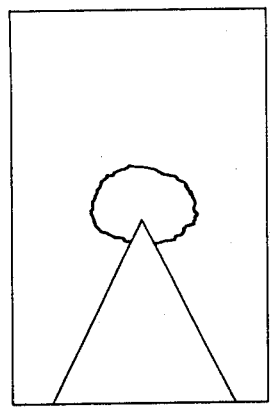
7 DAYS
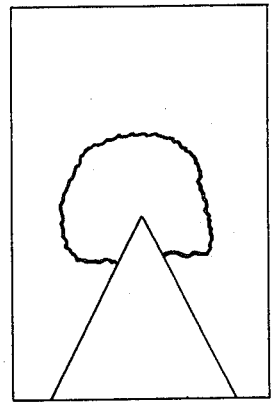
14 DAYS
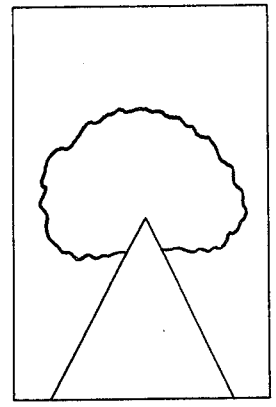
28 DAYS
TEST SAMPLE
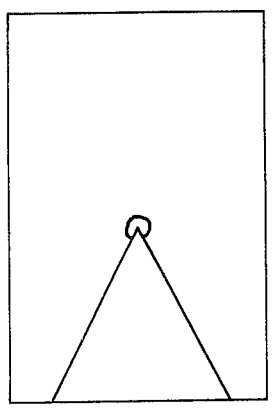
7 DAYS
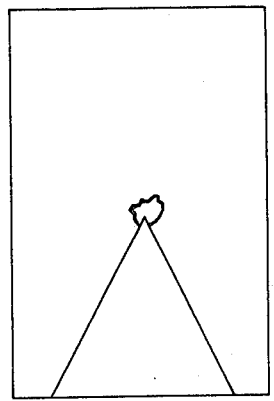
14 DAYS
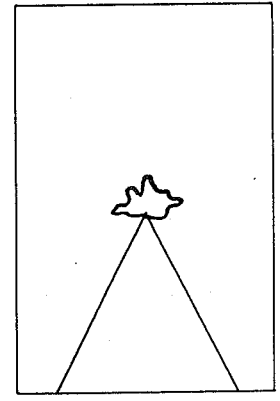
28 DAYS

TREE-RESISTANT ETHYLENE POLYMER COMPOSITIONS CONTAINING AROMATIC POLYCARBOXYLIC ACID

BACKGROUND OF THE INVENTION

This invention relates to ethylene polymer compositions especially useful in making cable insulation for high voltage applications. The composition contains an additive which provides resistance to electrical breakdown.

Electrical breakdown of high voltage insulation, known as dielectric failure, is often initiated at the sites of cavities and contaminating particles. Despite extreme care used in making, handling, and extruding ethylene polymer insulation, cavities and contaminants can be introduced in any step prior to final shaping. The breakdown of insulation in high voltage applications is known to the trade as electrical "treeing". Electrical treeing is a rather slow progressive degradation of an insulation composition caused by electron and ion bombardment of the insulation and resulting in the formation of microchannels or tubes having an overall tree-like appearance. Trees are initiated at locations of cavities or contaminants by the action of ionization (corona) during high voltage surges. Once initiated, trees usually grow, hastened by voltage surges, until such time as dielectric failure occurs.

Another phenomenon which may cause electrical breakdown is water treeing. Water trees are different in appearance from electrical trees. They have a diffuse and indistinct appearance; they do not appear to be branched or to be channels. They are believed by some researchers to be microcracks or minute water agglomerates. They are found only in cables that have been exposed to normal operating electric stresses in a moist or wet environment. Water trees, like electric trees, are initiated at cavities and contaminating particles. It has been suggested that as water trees grow, they can become electrical trees as part of the ultimate electrical breakdown.

To overcome the problem of treeing, various additives have been proposed, particularly for use in polyethylene or polyolefins, which additives serve to either prevent formation of trees or delay tree growth. Certain alcohols have been found to be very effective additives for delay of tree growth in ethylene polymer insulation. See U.S. Pat. No. 4,206,260 to E. J. McMahon. However, the alcohol content decreases with exposure of the insulation to elevated temperatures. Exudation of alcohol can be mitigated but not prevented by addition of polypropylene, as described in U.S. Pat. No. 4,283,459 to Urban et al.

Other additives which have been proposed for ethylene polymer insulation to increase resistance to electrical breakdown include: an inorganic salt of a strong acid with a strong zwitterion compound in U.S. Pat. No. 3,499,791 to Maloney; a ferrocene compound with a substituted quinoline compound in U.S. Pat. No. 3,956,420 to Kato et al.; silicone fluid in U.S. Pat. No. 3,795,646 to McKenzie, Jr.; and an aromatic ketone in Japanese Pat. No. 14348/75 to Fujikura Cable Works, Ltd.

SUMMARY OF THE INVENTION

According to the present invention, there is now provided a tree resistant composition for use in insulation for high voltage power transmission cables, said composition consisting essentially of an ethylene polymer selected from the group consisting of ethylene homopolymers and copolymers of ethylene with at least one other ethylenically unsaturated monomer, ethylene being present in such copolymers in an amount of at least 85 weight percent, and, as a tree-growth inhibitor, an effective amount of at least one organic carboxylic ester having at least one aromatic ring and at least three carboxylic ester groups, said inhibitor being liquid at the power transmission cable's intended operating temperature.

There also is provided an insulated cable for the transmission of electric power comprising at least one metallic conductor surrounded by electrical insulation containing at least one layer made of the above composition.

BRIEF DESCRIPTION OF THE DRAWING

The drawing shows the results of a water tree test for a control sample and a test sample.

DETAILED DESCRIPTION OF THE INVENTION

Power transmission cables which operate above about 4000 V, are particularly susceptible to tree formation, either by corona discharge or by external electrical disturbances. A high voltage power transmission cable usually comprises a metallic conductor surrounded by a semiconductive layer, an insulating layer, and another semiconductive layer. The effective amount of a tree-growth inhibitor of the present invention in the insulating layer is about 0.25–5% based on the weight of ethylene polymer. The preferred concentration of the inhibitor is 1–3%. The inhibitor may migrate from one layer to another and thus its concentration in the insulating layer may decrease below its original concentration. In order to avoid depletion of the inhibitor in the insulating layer, it may be practical to also incorporate initially some inhibitor in the semiconductive layers, which normally are ethylene homopolymer or copolymer compositions containing a form of elemental carbon, such as carbon black or graphite, as a filler. Alternatively, the initial ethylene polymer composition to be used in fabricating the insulating layer can be compounded with an excess of tree-growth inhibitor, so that after partial migration into the semiconductive layers, the concentration remaining in the insulating layer will be within the effective range. The inhibitor preferably is added to molten polymer since a good homogeneous blend is thus obtained the most readily. Other methods of combining the ester with the polymer include, for example, mixing with solid polymer prior to compounding and diffusing a liquid ester or a solution of ester in a volatile solvent into the polymer by spraying or soaking.

The ethylene polymer is either a homopolymer or a copolymer with at least one other monomer. Representative suitable other monomers include α-olefins such as, for example, propylene, 1-butene, 1-hexene, 1-octene, and 1-decene; butadiene, styrene, methacrylic acid, vinyl acetate, ethyl acrylate, isobutyl acrylate, and methyl vinyl ether. Both homopolymers and copolymers of ethylene are well known in the art and many are commercially available. They may be either linear or branched, high pressure or low pressure types, made in the presence of a free radical generator or with a coordination catalyst.

The ethylene polymer most likely to exhibit significant improvement in electrical endurance as a result of the addition of an inhibitor of the present invention is the low density polymer, that is, one which has a density of about 0.92 g/cm$^3$ or less. Medium density polymers, in the greater than 0.92 and up to about 0.94 g/cm$^3$ range, are improved to a lesser degree, while the high density polymer, greater than 0.94 g/cm$^3$, exhibits the least improvement. In any event, a tree-growth inhibitor of this invention does not inhibit tree initiation but only the rate of growth of trees after initiation.

The insulating compositions of the present invention will, in addition to the inhibitor, also contain other usual compounding ingredients, such as processing aids, antioxidants, and optionally curing agents (for example, peroxy compounds). Polypropylene and propylene-/ethylene copolymers are suitable processing aids. The total amount of processing aids may be as much as 10 percent of the weight of the base ethylene polymer. Low molecular weight polyethylene and wax also may be added. Carbon black normally will be present in the compositions forming the semiconductive layers but not in the insulating composition.

The tree-growth inhibitors of the present invention most suitably are esters of polycarboxylic aromatic acids, especially mellitic, trimesic, hemimellitic, trimellitic, and pyromellitic acids. Simple esters of aromatic dicarboxylic acids, for example phthalic or terephthalic acids, are not useful. Other possible esters include those where one or more carboxylic ester groups are attached to an aromatic ring and the remaining ester groups are attached to an aliphatic radical, for example, 3,5-dicarboxyphenylacetic acid esters; or where one or more carboxylic ester groups are attached to one aromatic ring and the remaining ester groups to another aromatic ring fused to the first, for example, 1,4,6-naphthalenetricarboxylic acid esters; or joined to it by a single bond, an alkylene group (especially a methylene group), a carbonyl group, or a hetero atom (especially oxygen or sulfur). These include esters of 2,4,4'-biphenyltricarboxylic acid, methylenebis(phthalic acids), and the corresponding acids in which carbonyl, oxygen, or sulfur replaces the methylene group. Such esters can be made by known methods. Their most important requirement is low melting point, which preferably is below the intended operating temperatures of the high voltage cable in which they are used. These esters preferably should be liquid at room temperature, but those melting below about 50° C. are useful in most applications. Mixtures of two or more esters can be used, and their melting temperatures normally will be lower than those of the individual esters. However, particularly useful esters are mixed esters, obtained by esterifying a polycarboxylic acid with a mixture of alcohols, because their melting temperatures are lower than those of the corresponding single alcohol ester blends. The preferred esters are those in which the alcohol portion is aliphatic, araliphatic, or cycloaliphatic, especially having 4-12 carbon atoms. However, esters of alcohols having either fewer or more carbon atoms, for example, 2 to 18, may be used.

Suitable alcohols thus include, for example, methyl, ethyl, various isomers of butyl, phenyl, hexyl, heptyl, octyl, decyl, dodecyl, hexadecyl, octadecyl, cyclohexyl, cycloheptyl, and benzyl alcohols.

Also suitable are oligomeric esters of dicarboxylic aromatic acids with aliphatic diols, especially diols having at least six carbon atoms and preferably at least eight carbon atoms, including various polyglycols. Suitable acids are, for example, terephthalic and isophthalic acids and methylenebis(benzoic acid). Suitable alcohols include, for example, 1,6-hexanediol, 1,8-octanediol, mixtures of these diols, and poly(ethylene glycol) and poly(propylene glycol) having number average molecular weights of about 500 to 2000.

The cable insulating compositions of the present invention are extruded in a conventional manner and can be cured, if desired, either by heating to the decomposition temperature of any free radical generator (e.g., peroxy compound) incorporated therein or by high energy radiation, for example, with an electron beam.

The electrical endurance of the insulating compositions of the present invention is determined in an accelerated test. Although the test is very useful in comparing the effectiveness of various tree-growth inhibitors, it does not directly predict the actual life expectancy of insulation in use. The following electrical tree test method is used.

Ethylene polymer for testing in accordance with this method is initially molded into a block herein termed a "SPINGS" (which is an acronym for "solid phase internal needle gap specimen"). A SPINGS is 25 mm square by 6 mm thick and contains two electrodes embedded lengthwise and in line, equidistant from the faces and from the opposite edges, with the tips usually spaced 4 mm apart but sometimes 2 mm apart at the center of the block. Each electrode is about 30 mm in length and about 0.6 mm in diameter. One electrode has a cone-shaped point at a 30° included angle with a radius of 5 $\mu$m and is the high voltage electrode. The second electrode has a 0.3 mm hemispherical radius on one end and is the ground electrode.

A minimum of ten SPINGS are used in this test. Each SPINGS is placed under silicone oil, thus, preventing surface flashover. The high voltage electrode is connected to a high voltage bus and the ground electrode is connected to a spaced pair of 6.25 centimeter spheres connected to ground through a 1 megohm resistor. A gap is set sufficiently wide between the spheres to achieve a voltage sufficient to initiate a tree in the SPINGS. For example, with the spheres set at 0.762 centimeter gap, a voltage (60 HZ) increasing at a rate of 500 volts/sec is applied until a discharge occurs between the two spheres. Before this breakdown occurs, the stress on the specimen is essentially zero; however, the instant the air gap breaks down, the applied voltage plus a radio frequency signal developed by the arc is impressed across the specimen electrodes and is maintained for 1 to 5 seconds, so that a tree will be initiated in the composition being tested.

After the tree has been initiated, the SPINGS is held without application of voltage for about 6 days, and then 12,000 volts is applied between the electrodes (an average applied voltage of 3000 V/mm). Failure is indicated by dielectric breakdown. When failure occurs, a sudden increase in current trips a relay that in turn terminates the test on that SPINGS and produces a signal on an event recorder. Individual SPINGS fail at different times. A failure time of a given composition is expressed as ($t_{50}$) which is the time at which 50% of the SPINGS under test have failed. This characteristic property is also called the electrical endurance of the composition.

This test has recently been standardized and is listed in the 1980 Annual Book of ASTM Standards (American Society for Testing and Materials, Philadelphia) as Standard D-3756-79. However, the time between tree initiation and actual test is not specified there.

This invention is now illustrated by the following examples of certain preferred embodiments thereof, wherein all parts, proportions, and percentages are by weight, unless otherwise indicated.

Unless otherwise specified, in all the tests in which polyethylene or polypropylene was used polyethylene was a high pressure, low density (0.918 g/cm$^3$) homopolymer, while polypropylene was an isotactic homopolymer having a density of about 0.902 g/cm$^3$.

CONTROL 1

Ten SPINGS were molded at 180° C. from a blend of 97 percent polyethylene and 3 percent polypropylene and tested at 12 KV as described above, except that a 2 mm needle gap was used. The electrical endurance ($t_{50}$) was 16 minutes.

CONTROL 2

Ten SPINGS were formed as in Control 1, and tested according to the above test method with a 4-mm needle gap. The electrical endurance ($t_{50}$) was 26.2 hours.

EXAMPLE 1

Tetraoctyl pyromellitate, 56 g, which had a melting point of 28° C., was added to 1760 g of pellets of a 97:3 polyethylene/polypropylene blend in a 3.79-L jar. The jar was sealed with a screw cap and rolled for 24 hours to coat the pellets. The composition was extruded at 180° C. in a 28 mm Werner & Pfleiderer twin-screw extruder to give pellets containing about 3 percent of the ester in the polyethylene/polypropylene blend. The pellets were formed at 180° C. into SPINGS and tested as described in Control 1. The test was discontinued after 1176 hr at 12 KV, during which time no failure occurred.

EXAMPLE 2

Tetraoctyl pyromellitate, 42 g, was added to 1816 g of the same polyethylene/polypropylene blend as that used in Example 1. The mixture was rolled in a 3.79-L jar for 16 hrs, then was extruded at 180° C. in the same 28 mm extruder; the extrudate was cut into pellets, which were divided into two approximately equal portions. Each half was separately shaken in the original jar for one-half hour and re-extruded. This composition was formed at 180° C. into SPINGS, which were tested at 24° C. according to the method of Control 2. These SPINGS survived 600 hr without failure, at which point the test was terminated.

EXAMPLE 3

Trioctyl mellitate, 60 g, was added to 1760 g of a blend of polyethylene/polypropylene in a 3.79-L jar. This mixture was rolled for twenty hours then extruded at 180° C. in the same extruder and the extrudate cut into pellets. This composition was formed into SPINGS at 160° C. and tested according to the method of Control 1. These SPINGS survived 1056 hours without a failure, at which point the test was terminated.

EXAMPLE 4

A mixed ester prepared by esterification of pyromellitic dianhydride using equimolar amounts of n-hexyl and n-octyl alcohols, was used in this example. To 1816 g of a blend of polyethylene/polypropylene resin was added 44 g of the mixed ester. This was rolled in a 3.79-L jar for 20 hours. The mixture was then extruded at 180° C. and the extrudate pelletized. The pellitized material was added back into the jar and rerolled to pick up any residual ester. It was then reextruded and repelletized. SPINGS were prepared from this composition at 180° C. and tested as in Control 2. These SPINGS survived 650 hours without a failure, at which point the test was terminated.

EXAMPLE 5

Polyethylene homopolymer, 2450 g, having a density of 0.920 g/cm$^3$ and a melt index of 2.5 g/10 min, was blended in a Banbury mixer with 50 g of the same mixed $C_6$ and $C_8$ pyromellitate ester as used in Example 4. When the temperature reached 149° C., the blend was shredded and cooled. It then was blended with 50 g of dicumyl peroxide at a temperature not over 121° C. and again shredded and cooled. SPINGS were prepared by melting the material in a mold at 130° C., maintaining this temperature for 10 minutes, applying a 13.8 MPa pressure, raising the temperature to 180° C., and maintaining it for 30 minutes to insure adequate crosslinking. The mold was cooled under pressure.

SPINGS prepared in this manner survived a 1200-hour test with a 4 mm electrode gap without a failure.

WATER TREE TESTS

The effectiveness of the ester additives of the present invention in inhibiting water tree growth can be evaluated in a test similar to that described in U.S. Pat. No. 4,212,756 to Ashcraft et al. The polymeric composition containing the inhibitor is shaped into a dish or "pie plate" having 24 conical depressions equally distributed in its bottom. The bottom of the dish is sprayed on the outside with metallic silver to form one electrode. After an electrolyte (e.g., 0.1% NaCl solution) is poured into the dish, a wire connected to a high voltage source is contacted with the solution. Tests are run at a voltage of 5 kV and a frequency of 1 kHz for a period of several days. The test plate is then cut into blocks containing one depression per block. The blocks are dyed with methylene blue and cut into 0.4 mm slices parallel to the axis of the cone. The slices are examined under a microscope at a fixed magnification and photographed.

The FIGURE shows the results of a test in which an uninhibited polyethylene was used as control. The inhibited sample contained 2% of tetrahexyl pyromellitate. It can be seen that water trees formed at the apex of the cone after 7, 14, and 28 days are much smaller in the test specimens of the inhibited composition. Tetrahexyl pyromellitate thus is an effective water tree inhibitor.

OVEN TESTS

Tree-growth inhibitors should not only survive the SPINGS test and show very little tree growth in the water tree test but they should also have the property of being retained in the insulating layer of the cable even when the cable has been heated to excess. This is especially true for crosslinkable insulating compositions since they are normally tested under more severe heating conditions than the uncrosslinked thermoplastics.

The test for inhibitor retention consists of pressing out small, 0.46 mm thick films for infrared scans. These films are mounted in standard stiff paper mounts and scanned in an infrared spectrophotometer over an appropriate frequency range which depends on the tree inhibitor being tested. The mounted film is then hung in a circulating air oven at 75° C. The film is removed at intervals and scanned to determine the amount of inhibitor remaining. A good inhibitor will be substantially retained even after several hundred hours of tests. This test is much more severe than required to evaluate retention in normal cable service.

OVEN TEST EXAMPLES

EXAMPLE 6

Tetraoctyl Pyromellitate in Polyethylene

Two films were formed from the same composition and mounted on infrared card holders. The films were heated in a 75° C. high velocity air oven and the infrared absorption peak at 1095 cm$^{-1}$ was used to determine the amount of tetraoctyl pyromellitate. The following tetraoctyl pyromellitate concentrations were determined by this technique:

| Oven Time | Analysis #1 | Analysis #2 | Average |
| --- | --- | --- | --- |
| 0 | 2.91% | 3.37% | 3.14% |
| 24 hr | 2.93% | 3.16% | 3.05% |
| 96 hr | 2.99% | 3.36% | 3.17% |
| 168 hr | 3.08% | 3.27% | 3.17% |
| 336 hr | 2.96% | 3.36% | 3.16% |

EXAMPLE 7

Trihexyl Trimellitate in Polyethylene

Two infrared films were prepared as in Example 6 and tested in the same manner. In this example, the infrared peak at 1065 cm$^{-1}$ was used to determine the amount of the ester present.

| Oven Time | Analysis #1 | Analysis #2 | Average |
| --- | --- | --- | --- |
| 0 | 3.04% | 3.40% | 3.22% |
| 24 hr | 3.24% | 3.32% | 3.28% |
| 96 hr | 3.13% | 3.35% | 3.24% |
| 168 hr | 3.22% | 3.31% | 3.27% |
| 336 hr | 3.03% | 3.01% | 3.02% |
| 504 hr | 3.11% | 3.07% | 3.09% |

COMPARATIVE EXAMPLE 1

Dodecyl Alcohol in Polyethylene

Dodecyl alcohol, one of the alcohols listed in U.S. Pat. No. 4,206,260 to E. J. McMahon, was found in this test to be readily lost from a polyethylene film under the conditions of Examples 6 and 7. The infrared peak at 1060 cm$^{-1}$ was used in this study. The initial alcohol concentration was 4.20–4.22%. After 4 hours at 75° C., the characteristic infrared peak disappeared, indicating complete loss of dodecyl alcohol.

COMPARATIVE EXAMPLE 2

Acetophenone in Polyethylene

Acetophenone is recognized as an effective tree inhibitor. It is a major decomposition product of dicumyl peroxide, so that it usually is present in dicumyl peroxide-crosslinked polyethylene compositions. The same technique was used for the film preparation as in the preceding examples, but a temperature of 75° C. was maintained in the oven without air circulation. Infrared absorption at 955 cm$^{-1}$ was determined at intervals, giving the following acetophenone concentrations:

| Oven Time | Acetophenone Concentration |
| --- | --- |
| 0 | 1.63% |
| 15 min. | 0.49% |
| 30 min. | 0.18% |
| 60 min. | 0 |

It can be seen that acetophenone is lost very quickly under very mild conditions.

We claim:

1. A tree-resistant composition for use in electrical equipment, said composition consisting essentially of an ethylene polymer selected from the group consisting of ethylene homopolymers and ethylene copolymers with at least one other ethylenically unsaturated monomer, ethylene being present in such copolymers in an amount of at least 85 weight percent, and, as a tree-growth inhibitor, an effective amount of at least one organic carboxylic ester having at least one aromatic ring and at least three carboxylic ester groups, said inhibitor melting below about 50° C. and being liquid at the power transmission cable's intended operating temperature.

2. A composition of claim 1 wherein the amount of the tree-growth inhibitor is about 0.25–5% based on the weight of the ethylene polymer.

3. A composition of claim 2 wherein the amount of the tree-growth inhibitor is 1–3% based on the weight of the ethylene polymer.

4. A composition of claim 1 wherein the ethylene polymer has a density of about 0.92 g/cm$^3$ or less.

5. A composition of claim 4 wherein the ethylene polymer is a homopolymer.

6. A composition of claim 1 wherein there is present, in addition to the ethylene polymer, also a polypropylene or ethylene/propylene copolymer, the amount of such additional polymer or copolymer being up to about 10 weight percent of the ethylene polymer.

7. A composition of claim 1 wherein the tree-growth inhibitor is selected from the group consisting of esters of mellitic acid, trimesic acid, hemimellitic acid, trimellitic acid, and pyromellitic acid with a $C_4$–$C_{12}$ aliphatic or cycloaliphatic alcohol.

8. A composition of claim 7 wherein the ester is tetraoctyl pyromellitate.

9. A composition of claim 1 which also contains an organic peroxide.

10. A composition of claim 1 wherein the inhibitor is a mixed ester of a polycarboxylic acid with two or more alcohols.

11. A composition of claim 1 which also contains a form of elemental carbon as a filler.

* * * * *

UNITED STATES PATENT AND TRADEMARK OFFICE
CERTIFICATE OF CORRECTION

PATENT NO. : 4,374,224
DATED : February 15, 1983
INVENTOR(S) : John Knox Beasley and Edward John Urban It is certified that error appears in the above—identified patent and that said Letters Patent is hereby corrected as shown below:

Title Page - The title should read "Tree-Resistant Ethylene Polymer Compositions"

Signed and Sealed this

Twenty-eighth Day of February 1984

[SEAL]

Attest:

GERALD J. MOSSINGHOFF

Attesting Officer    Commissioner of Patents and Trademarks